United States Patent
Bedekar et al.

(10) Patent No.: US 9,960,961 B2
(45) Date of Patent: May 1, 2018

(54) METHODS AND APPARATUS FOR RADIO ACCESS NETWORK RESOURCE MANAGEMENT

(71) Applicant: Nokia Solutions and Networks Oy, Espoo (FI)

(72) Inventors: Anand Bedekar, Arlington Heights, IL (US); Vishnu Ram Omanakutty Amma Vijayaraghavan Nair, Bangalore (IN); Mikko Tapani Suni, Espoo (FI); Carlos Manzanares Sancho, Tampere (FI)

(73) Assignee: Nokia Solutions and Networks Oy, Espoo (FI)

( * ) Notice: Subject to any disclaimer, the term of this patent is extended or adjusted under 35 U.S.C. 154(b) by 103 days.

(21) Appl. No.: 14/734,019

(22) Filed: Jun. 9, 2015

(65) Prior Publication Data

US 2016/0366009 A1    Dec. 15, 2016

(51) Int. Cl.
*H04L 12/24* (2006.01)
*H04W 24/02* (2009.01)
*H04L 12/911* (2013.01)
*H04L 12/26* (2006.01)

(52) U.S. Cl.
CPC ...... *H04L 41/0803* (2013.01); *H04L 41/0631* (2013.01); *H04L 43/0817* (2013.01); *H04L 47/70* (2013.01); *H04W 24/02* (2013.01)

(58) Field of Classification Search
CPC ........... H04W 72/0426; H04W 76/022; H04W 76/025; H04W 76/026; H04W 76/028; H04W 8/08–8/245; H04L 41/08
See application file for complete search history.

(56) References Cited

U.S. PATENT DOCUMENTS

| 2009/1170472 | | 7/2009 | Chapin et al. |
| 2011/1185063 | | 7/2011 | Head et al. |
| 2013/0070742 | A1 | 3/2013 | Picker et al. |
| 2014/0314049 | A1* | 10/2014 | Cho ........................ H04L 5/006 370/332 |
| 2015/0055483 | A1* | 2/2015 | Lee ..................... H04L 41/0869 370/242 |

(Continued)

FOREIGN PATENT DOCUMENTS

| WO | WO 2014/060424 A2 | 4/2014 |
| WO | WO 2016074702 A1 * | 5/2016 ........... H04L 41/044 |

*Primary Examiner* — Marcus R Smith
(74) *Attorney, Agent, or Firm* — Harrington & Smith

(57) ABSTRACT

Systems and techniques for managing interaction between a network operator and entities managing resources and instances in a virtual radio access network. A radio access network resource manager comprises a database mapping cells to resources and instances associated with the cells, and one or more interfaces between the network operator and the entities managing resources and instances. The radio access network manager mediates commands and information received from the network manager and from the entities managing resources and instances, translating cell-level commands and information from the network manager to commands and information relating to associated resources and entities, and translating resource and instance-level information and requests from the entities managing resources and instances to cell-level information and requests to the network operator.

20 Claims, 12 Drawing Sheets

(56) References Cited

U.S. PATENT DOCUMENTS

| | | | |
|---|---|---|---|
| 2015/0296392 A1* | 10/2015 | Chen | H04W 16/00 370/328 |
| 2016/0029205 A1* | 1/2016 | Sirotkin | H04W 24/02 455/418 |
| 2016/0113018 A1* | 4/2016 | Li | H04W 72/0493 709/226 |

* cited by examiner

METHODS AND APPARATUS FOR RADIO ACCESS NETWORK RESOURCE MANAGEMENT

TECHNICAL FIELD

The exemplary and non-limiting embodiments of this invention relate generally to wireless communications. More particularly, embodiments of the invention relate to systems and techniques for management of radio access network resources which may comprise distributed physical resources.

BACKGROUND

Traditional wireless communication systems, such as those operating under third generation partnership project (3GPP) standards and specifications, as well as 3GPP long term evolution (LTE), LTE-advanced (LTE-A), have frequently been focused on the use of dedicated physical and computational resources to serve users in a particular location, with a base station serving users in a more or less well defined area. Different base stations may cooperate with one another, particularly if they overlap one another's coverage area, but the focus has generally been on the placement of physical resources and the control of those resources.

In recent years, communication and computing technology has allowed for more and more applications directed to virtualization of resources—for example, virtual computing machines—"cloud" computing, or virtual—"cloud" storage, in which various hardware and software installations are. It is also possible to design or configure wireless communication resources so as to present "virtual" cells or other radio access network elements, in which one or more controlling elements allocates functions to available physical resources to perform desired functions and achieve a desired configuration.

SUMMARY OF THE INVENTION

In one embodiment of the invention, a method comprises configuring a network mapping database storing mapping information for cells of a wireless communications network comprising a pool of resources available for allocation for use by one or more wireless communication cells, wherein configuring the information comprises storing the information in a repository providing mapping between resources in the pool and one or more cells to which the resources are allocated; configuring an operator interface between the network mapping database and a network operator; configuring a resource controller interface between the network mapping database and one or more network resource controlling entities; and, in response to cell information received from or requested by the network operator and resource information received from and requested by the one or more network resource controlling entities, associating the cell information with associated resources using the network mapping database.

In another embodiment of the invention, an apparatus comprises at least one processor and memory storing a program of instructions. The memory storing the program of instructions is configured to, with the at least one processor, cause the apparatus to at least configure a network mapping database storing mapping information for cells of a wireless communications network comprising a pool of resources available for allocation for use by one or more wireless communication cells, wherein configuring the information comprises storing the information in a repository providing mapping between resources in the pool and one or more cells to which the resources are allocated; configure an operator interface between the network mapping database and a network operator; configure a resource controller interface between the network mapping database and one or more network resource controlling entities; and, in response to cell information received from or requested by the network operator and resource information received from and requested by the one or more network resource controlling entities, associate the cell information with associated resources using the network mapping database.

In another embodiment of the invention, a computer readable medium stores a program of instructions. Execution of the program of instructions by at least one processor configures an apparatus to at least configure a network mapping database storing mapping information for cells of a wireless communications network comprising a pool of resources available for allocation for use by one or more wireless communication cells, wherein configuring the information comprises storing the information in a repository providing mapping between resources in the pool and one or more cells to which the resources are allocated; configure an operator interface between the network mapping database and a network operator; configure a resource controller interface between the network mapping database and one or more network resource controlling entities; and, in response to cell information received from or requested by the network operator and resource information received from and requested by the one or more network resource controlling entities, associate the cell information with associated resources using the network mapping database.

DETAILED DESCRIPTION

One or more embodiments of the present invention address the greater complexity involved in configuring and operating a "virtual" cell or network. A virtual radio access network (RAN) may be referred to as a cloud RAN.

Management of a traditional cell involves managing a single, or a defined group of, network elements. Management of a virtual cell is more complicated, involving as it does the specification of functions and the allocation of those functions to different hardware elements. A cell may be served by a series of radio access network (RAN) virtualized network functions (VNFs). One VNF might be, for example, a scheduler VNF, comprising one or more instances of Layer 2 VNFs which collectively serve a pool of cells.

Complexity also arises from the fact that the set of virtual instances, as well as the underlying computing resources to which these instances are assigned, may change over the lifecycle of a cell. This ability to change is in fact a significant advantage of virtualization, but it does add complexity. For example, the VNFs for the Layer 2 or Layer 3 scheduler may scale (that is, the number of instances may change) or the instances may be migrated from one physical resource to another. Even in cases in which the L1 of a cell is in a single location, its placement may be dynamically chosen or migrated.

Instances may be pooled across cells—that is, any instance can serve any users from any cells. A given cell's users may be distributed across multiple instances. Further, user contexts may be transferred from one instance to another e.g. for load-balancing across instances.

Figure 1:
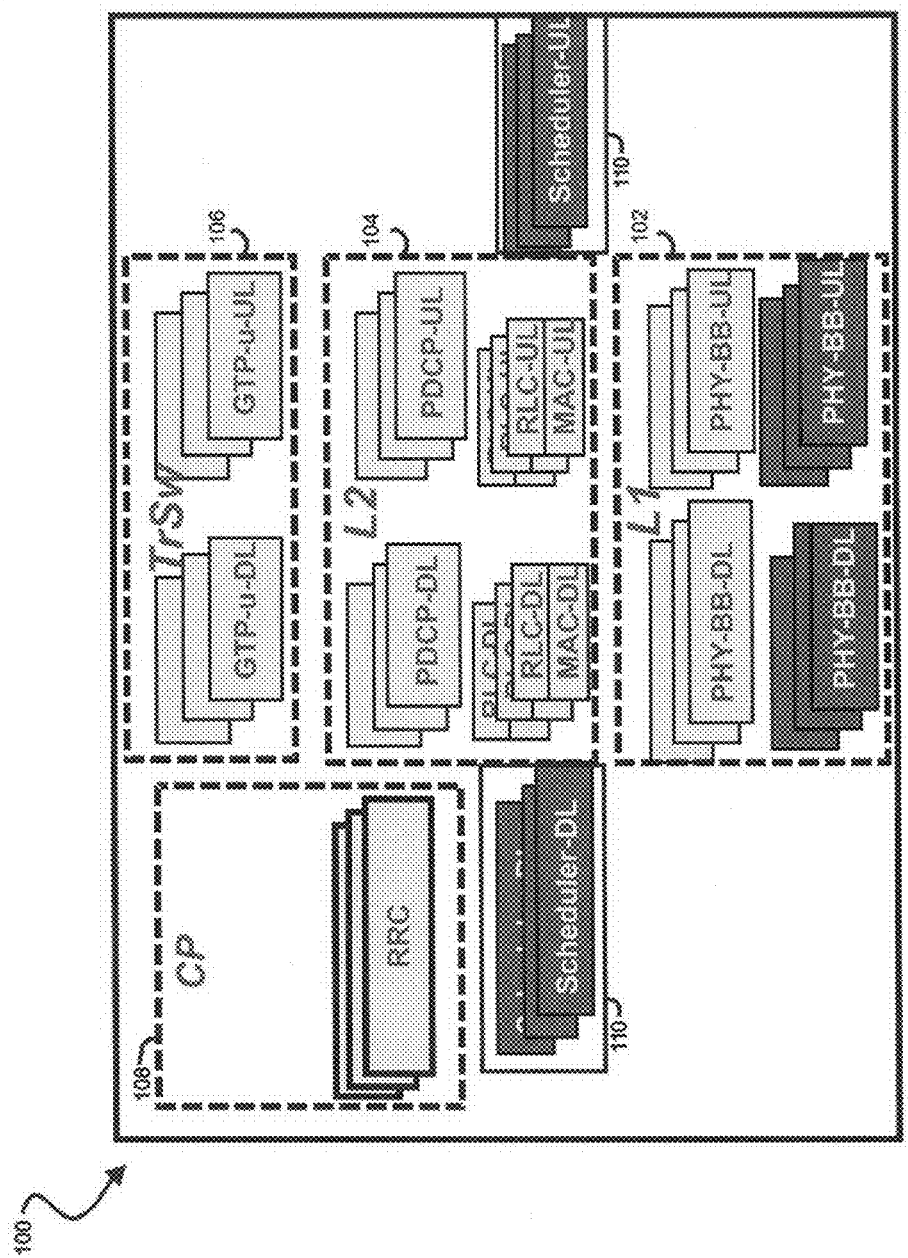
FIG. 1 illustrates a virtual radio access network that may advantageously employ mechanisms according to embodiments of the present invention.

FIG. 1 illustrates an exemplary cloud RAN configuration 100, comprising a layer 1 (L1) domain 102, a layer 2 (L2) domain 104, a Transport Software (TrSw) domain 106, a Control Plane (CP) domain 108, and a scheduler domain 110. These domains provide the functionality required for the operation of the RAN by means of one or more instances, which may be for example virtual machines or execution objects or other embodiments. The L1 domain 102 comprises multiple instances of physical baseband uplink and downlink, the L2 domain 104 comprises multiple instances of PCDP uplink and downlink, RLC uplink and downlink, and MAC uplink and downlink, the TrSv domain 106 comprises multiple instances of GTP-u uplink and downlink, the CP domain 108 comprises multiple instances providing for example Radio Resource Control (RRC) functionality, and the scheduler domain 110 comprises multiple uplink and downlink scheduler instances.

Figure 2:
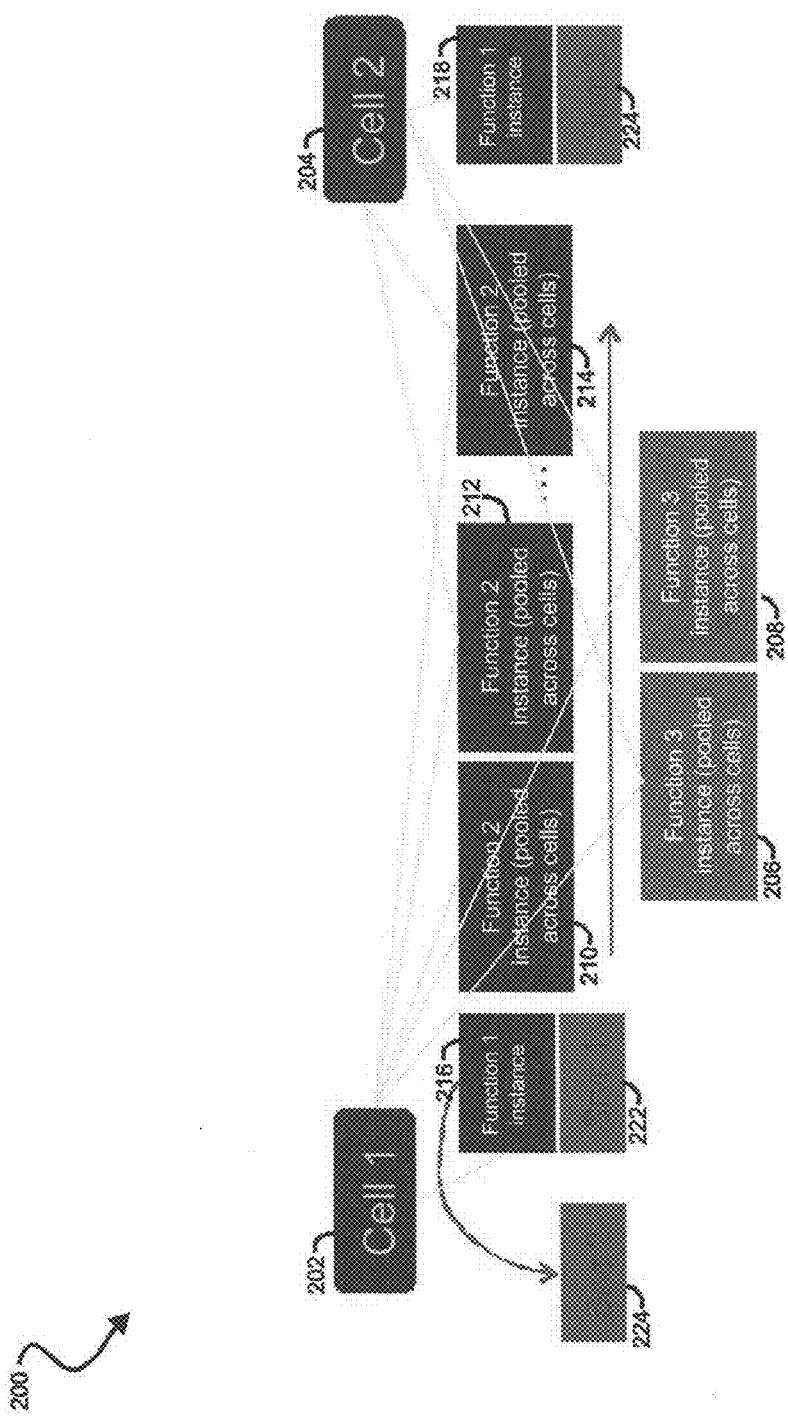
FIG. 2 illustrates a virtual cell configuration that may advantageously use one or more embodiments of the present invention.

FIG. 2 illustrates an exemplary virtual cell configuration 200 that may advantageously use one or more embodiments of the present invention, comprising virtual cells 202 and 204. The functions associated with these cells, such as Layer 1 or Layer 2 or Scheduling, may be provided by a multitude of instances of the different functions, for example layer 1 instances 206 and 208, layer 2 instances 210, 212, and 214, and scheduling instances 216 and 218. These instances may be mapped to various resources, which are also variously referred to as compute nodes or Servers (exemplified by Srvr 1 220, Srvr 2 222, or Srvr 3 224), or other dedicated processing platforms or accelerators. The resources may also comprise networking resources and storage resources in addition to compute resources. The virtual cells 202 and 204 can use instances as needed, and the number of instances may vary due to elastic scaling. The mapping of instances to compute resources may also change, for example due to scaling, or due to migration wherein an instance is relocated from one compute resource to another. Moreover, the exact mapping of which cells are served by which instances of the different functions, or which users of the various cells are served by which instances of the different functions, may also be flexible. For example it may be dynamically based on load-balancing or pooling considerations, and may change over time as load in various cells evolves.

In order to manage the use of resources in a variable configuration such as cloud RAN, one or more embodiments of the present invention provide for a RAN resource manager, which presents an interface such as an application programming interface (API) to an operator to invoke RAN actions. Exemplary RAN actions include:

addition of a cell, involving the updating of mapping between one or more cells and resources or instances;

updating resource or instance use, involving the updating of mapping between instance or resource to one or more cells upon, for example, scaling or migration;

checking cell status;

gathering cell statistics;

determining conditions and the severity and receiving Report alarms;

providing information on mapping between cells and resource/instance use to a controlling entity such as an orchestrator virtualized network function (VNF) manager, or virtualized infrastructure manager (VIM) to assist in instance placement decisions during scaling and migration.

Figure 3:
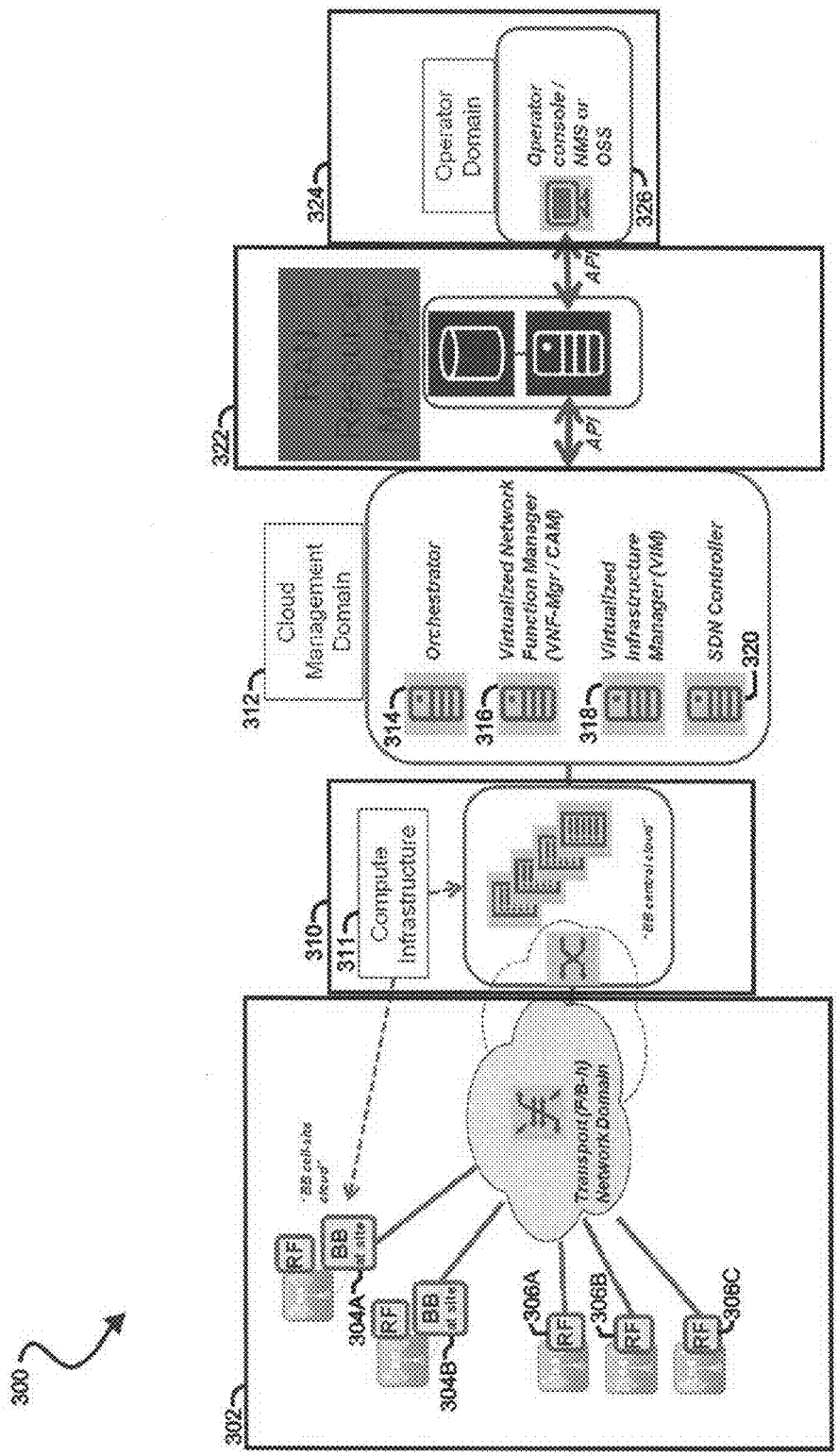
FIG. 3 illustrates a network configuration according to one or more embodiments of the present invention.

FIG. 3 illustrates an exemplary network configuration 300 employing physical and virtual cells, and employing mechanisms according to one or more embodiments of the present invention. The configuration network configuration 300 illustrated here comprises a transport network domain 302, comprising a plurality of communication resource elements, including baseband cell site units 304A and 304B, and radio frequency elements 306A-306C. These elements provide resources for a baseband central cloud domain 310, administered by a computing infrastructure 311. The illustrated network configuration 300 further comprises a cloud management domain 312, which comprises an orchestrator 314, Virtual Network Function (VNF) manager 316, virtualized infrastructure manager (VIM) 318, and software defined network (SDN) controller 320. The VNF Manager, VIM, and Orchestrator cooperate to initiate various actions related to the resources and to instances of various RAN functions, such as creation or deletion of instances, assignment of resources to instances, scaling of instances by allocating more or fewer resources to the instances, or migration of an instance from one resource to another. A radio access network resource manager (RAN resource manager) 322 serves as an intermediary between the cloud management domain 312 and an operator domain 324. The operator domain 324 comprises an operator console 326, which may suitably be implemented as a computer workstation or other data processing device. The RAN resource manager 322 presents an interface, such as an application programming interface, to the cloud management domain 312 and to the operator domain 324.

Figure 4:
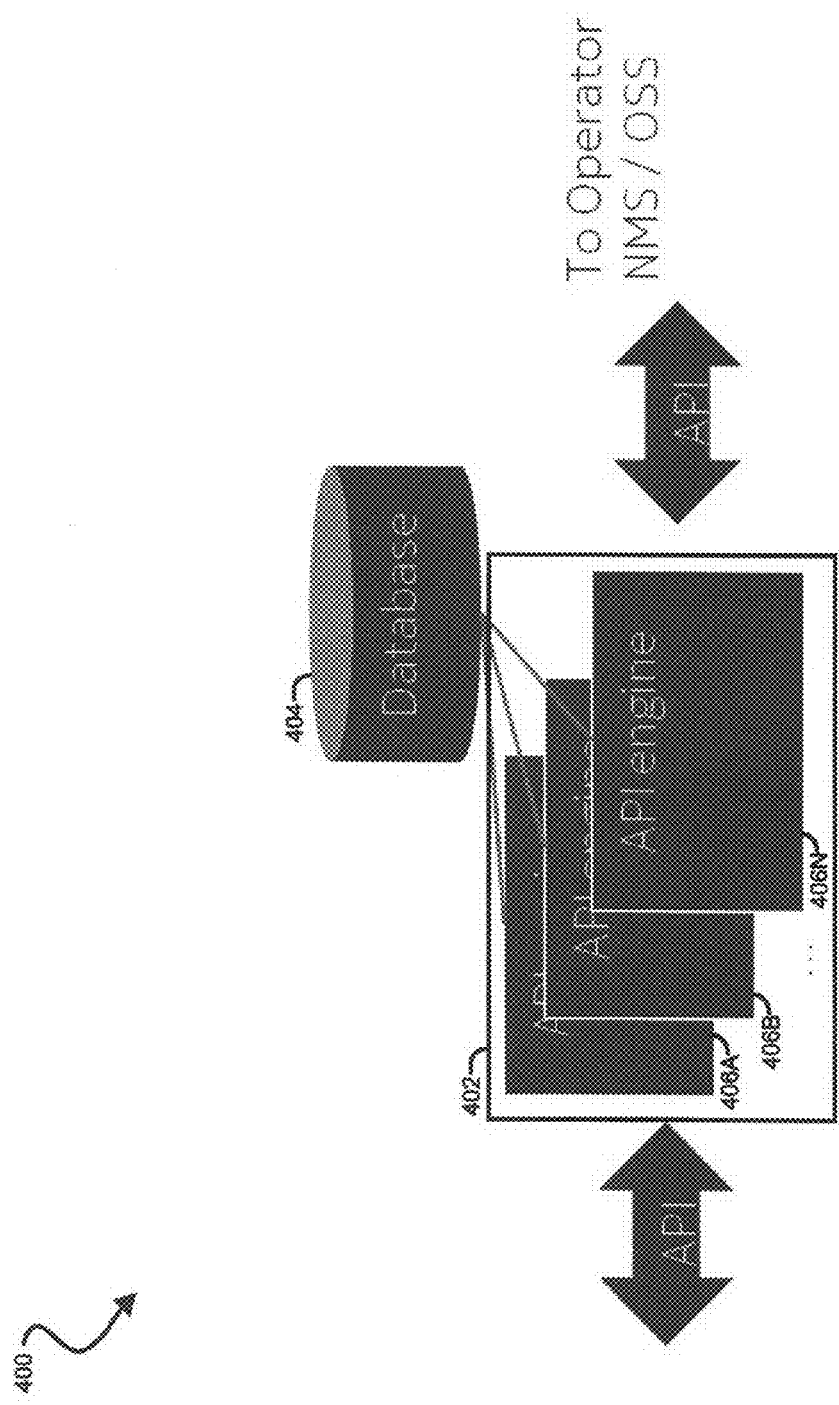
FIG. 4 illustrates a radio access network resource manager according to an embodiment of the present invention.

FIG. 4 illustrates details of a radio access network (RAN) resource manager such as the RAN resource manager 322. The RAN resource manager 322 comprises an application processing interface (API) engine 402, together with a back-end database 404. In one or more embodiments, the API engine may comprise a set of virtualized instances 406A, 406B, 406N, to allow for horizontal scalability. The database 404 maintains a mapping between cells and instances or resources, and may associated with each cell information for each type of functional instance. The associated information for each type of functional instance may include information such as identifier, virtual address, physical resource address, and capacity indication. Exemplary types of functional instances are layer 2, layer 2 (FDCP, RLC, MAC), scheduler, layer 3 (RRC/S1/X2), and transport (GTP/IPSec), but these types are exemplary only and that database may host suitable information for any type of functional instance to be used.

Figure 5:
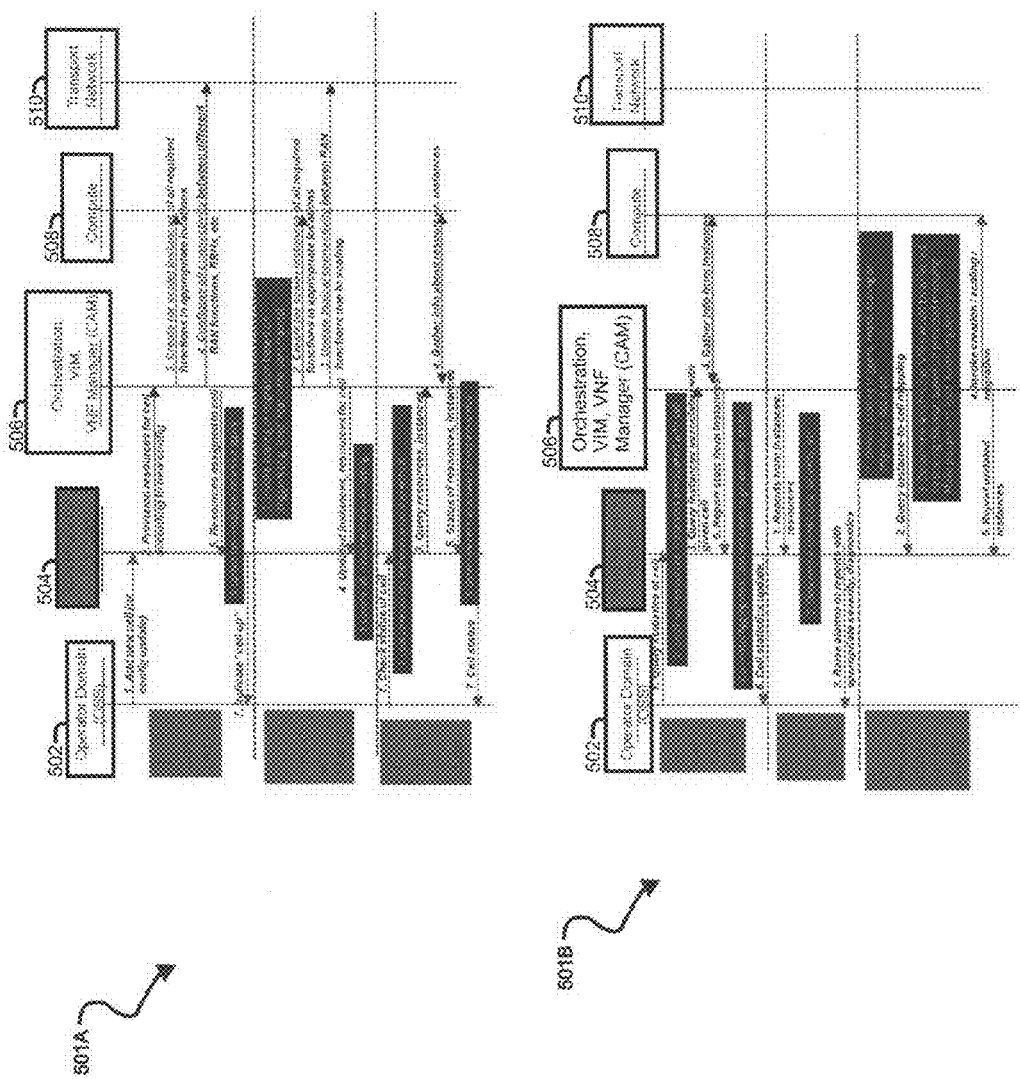
FIG. 5 illustrates exchanges of information between, and procedures performed by, elements according to embodiments of the present invention.

FIG. 5 presents diagrams 501A and 501B, illustrating procedures performed under the control of a RAN resource manager 502 according to one or more embodiments of the present invention, and showing information exchanged between, and actions performed by, the RAN resource manager 502 and other network elements—namely, an operator domain 504, cloud management domain 506, computational infrastructure 508, and transport network domain 510. The RAN resource manager 502 controls the network to perform procedures 1-6:
1. cell addition;
2. network update due to scaling;
3. cell status check;
4. cell status information retrieval;
5. alarm report;
6. information delivery to aid scaling FIGS. 6-11 illustrate processes 600-1100 of RAN resource manager procedures according to embodiments of the present invention, showing details of the procedures listed above.

Figure 6:
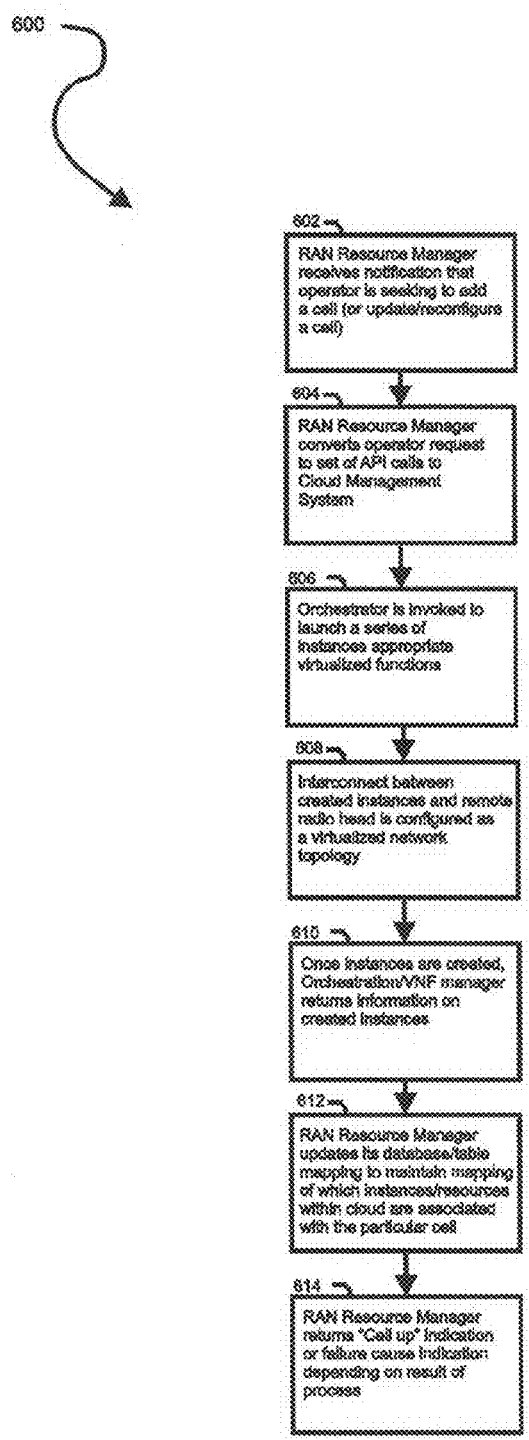
FIGS. 6-11 illustrate details of procedures according to embodiments of the present invention.

FIG. 6 illustrates a process 600 for addition of a cell, or update or reconfiguration of cell parameters.

At block 600, the RAN Resource Manager receives a notification from the operator OSS or NMS through the RAN Resource Manager API that NMS (or OSS) is seeking to add a given cell (or update/reconfigure parameters of a cell). This request may provide addressing (for example Geographical coordinates, or identities/locations on the wide-area transport network) of the Remote Radio Head with which the cell should be associated, and other parameters of the cell.

At block 604, The RAN Resource Manager converts the operator request to an appropriate set of API calls into the Cloud Management System (comprising Orchestrator, Virtualized Infrastructure Manager, and VNF Manager). If the RAN clouds are distributed (e.g. RAN is a collection of many small clouds), then an appropriate cloud may be selected by the RAN resource manager and Orchestrator as well.

At block 606, the orchestrator is invoked to launch a series of instances of appropriate virtualized functions, with appropriate parameters, through the VNF Manager and Virtualized Infrastructure Manager, and place the instances at appropriate locations (for example compute cores on servers, or appropriate hardware cards in the case of Layer 1 functions, etc.) in the cloud compute infrastructure.

At block 608, the interconnect between the created instances and the remote radio head is also configured as a virtualized network topology, for example using SDN/Openflow.

At block 610, once the instances are created, the Orchestration/VNF Manager/VIM returns information on the created instances (for example assigned physical resources, addressing, etc.) to the RAN resource manager.

At block 612, the RAN resource manager updates its database/table maintaining the mapping of which instances/resources within the cloud are associated with that particular cell.

At block 614, the RAN resource manager returns a "Cell up" indication to the Operator NMS or OSS, indicating success, or, in the case of a failure, the RAN resource manager can return an appropriate cause indication to the NMS depending on the responses back from Orchestration/VNF Mgr/VIM at block 610.

Figure 7:
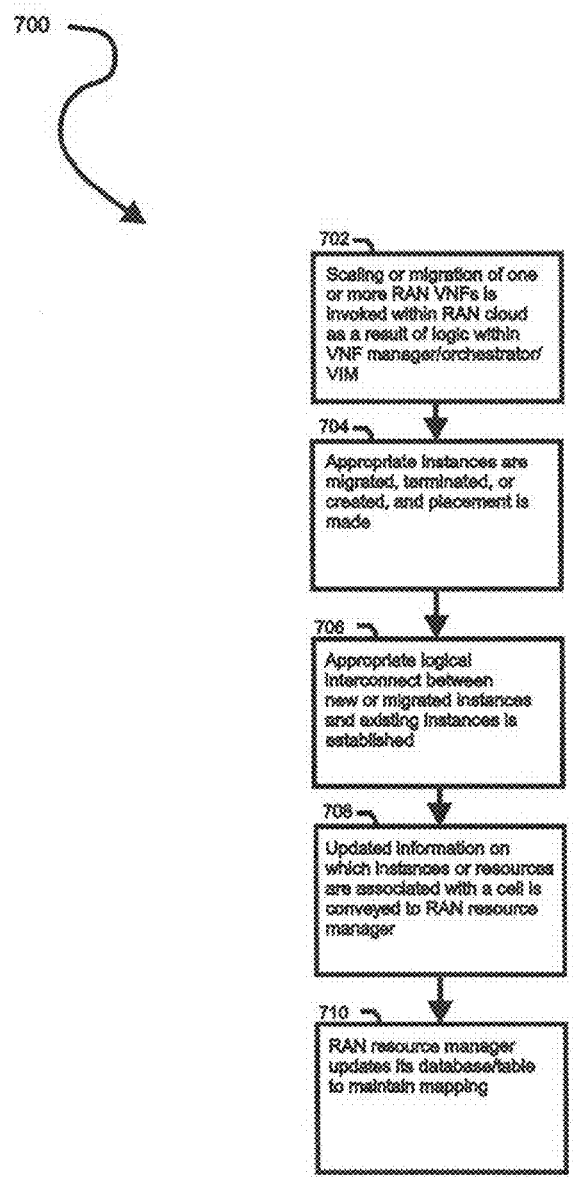

FIG. 7 illustrates a process 700 of updating instance/resource to cell mapping upon scaling or migration. The RAN resource manager exposes an API to allow Orchestration/VNF Manager/VIM to update information on instance/resources on scaling/migration or other cloud infrastructure events.

At block 702, within the RAN cloud, scaling (or migration) of one or more RAN VNFs is invoked as a result of the logic within the VNF Manager/Orchestrator/VIM (for example, based on load, real-time deadline considerations, or other criteria).

At block 704, appropriate instances are migrated, or terminated (if scaling in) or new instances created (if scaling out), and are placed at the appropriate resources based on placement algorithm. Assignment of cells/users to instances is performed e.g. based on load-balancing considerations At block 706, appropriate logical interconnect between the new/migrated instances and existing instances is established.

At block 708, updated information on which instances/resources are associated with a cell is conveyed to the RAN resource manager.

At block 710, the RAN resource manager updates its database/table to maintain this mapping.

Figure 8:
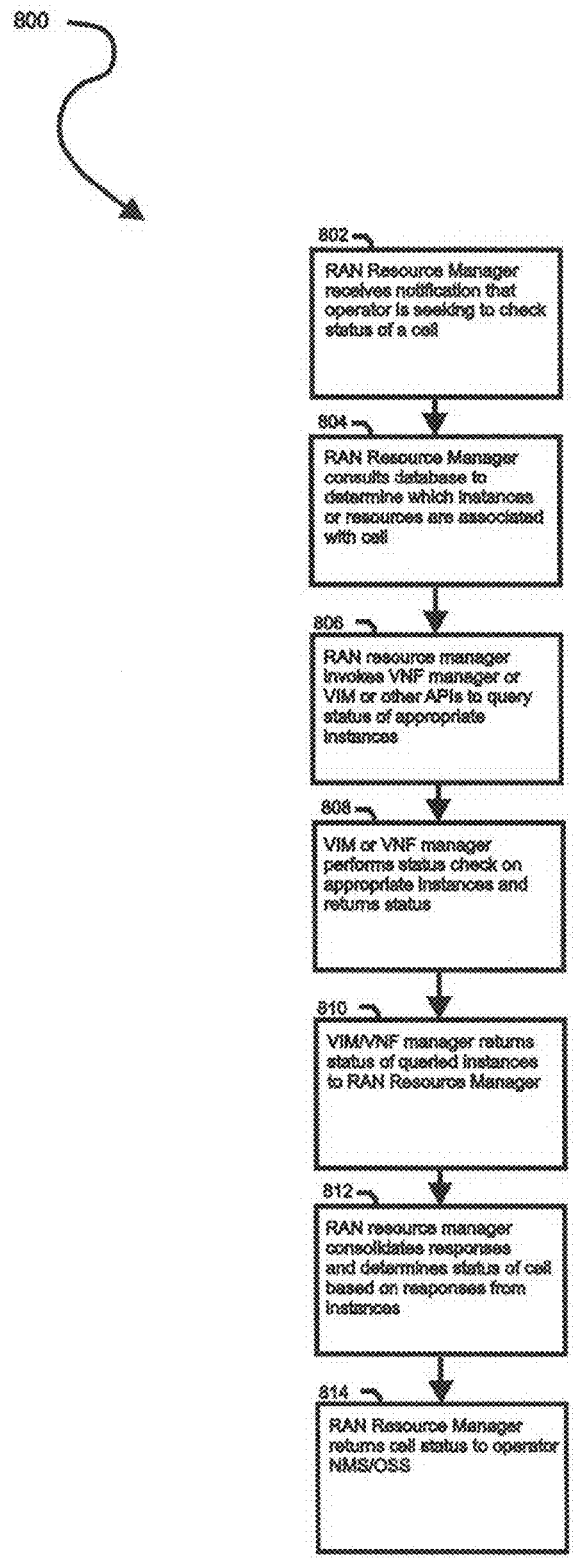

FIG. 8 illustrates a process 800 of querying cell status. The RAN resource manager exposes an API to NMS to allow querying cell-level status, and an API to VNF Manager/VIM to gather instance-level or resource-level status. RAN resource manager converts instance/resource-level status into cell-level status.

At block 802, the RAN resource manager receives Operator NMS (or OSS) notification through the RAN Resource Manager API that NMS (or OSS) wants to check the status of a given cell.

At block 804, the RAN resource manager consults its database to determine which instances/resources are associated with that cell At block 806, the RAN resource manager invokes VNF Manager or VIM or other APIs to query the status of appropriate instances, including virtualized and non-virtualized instances as well as Remote RF Head, etc.

At block 808, the VIM or VNF Manager in turn perform status check on the appropriate instances and returns the status.

At block 810, the VIM/VNF Manager return the status of queried instances to the RAN Resource Manager At block 812, the RAN resource manager consolidates the responses and determine the status of the cell based on the responses from the instances.

At block 814, the RAN resource manager returns the cell status to the Operator NMS/OSS.

Figure 9:
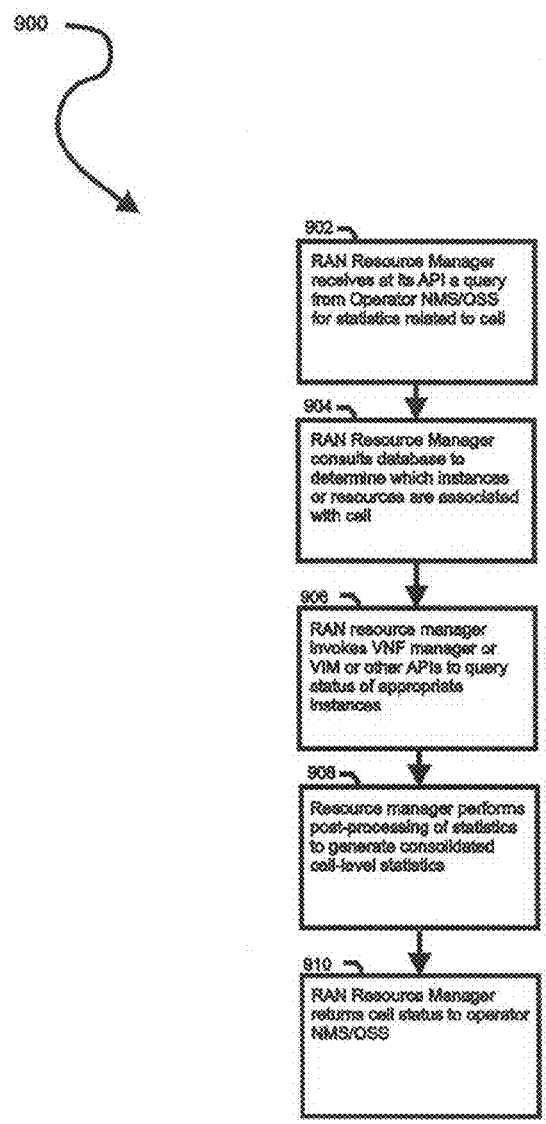

FIG. 9 illustrates a process 900 of gathering cell statistics. The RAN resource manager exposes an API to NMS to allow querying cell-level statistics, and an API to VNF Manager/VIM to gather instance-level statistics. The RAN resource manager converts instance/resource-level statistics into cell-level statistics.

At block 902, the RAN resource manager receives at its API a query from the Operator NMS/OSS for statistics related to a cell. Statistics can be at a given functional layer, or across all functional layers.

At block 904, the RAN resource manager examines its database to determine which instances of appropriate layers are associated with a given cell.

At block 906, the RAN Resource manager uses VNF Manager or VIM APIs to query the appropriate instances about statistics related to the given cell. This may be performed for multiple instances.

At block 908, because a cell may be served by multiple such instances, the resource manager correlates or sums (or performs other post processing for) the statistics reported by the different instances, to obtain consolidated cell-level statistics.

At block 910, cell statistics are reported to the querying Operator NMS/OSS.

Figure 10:
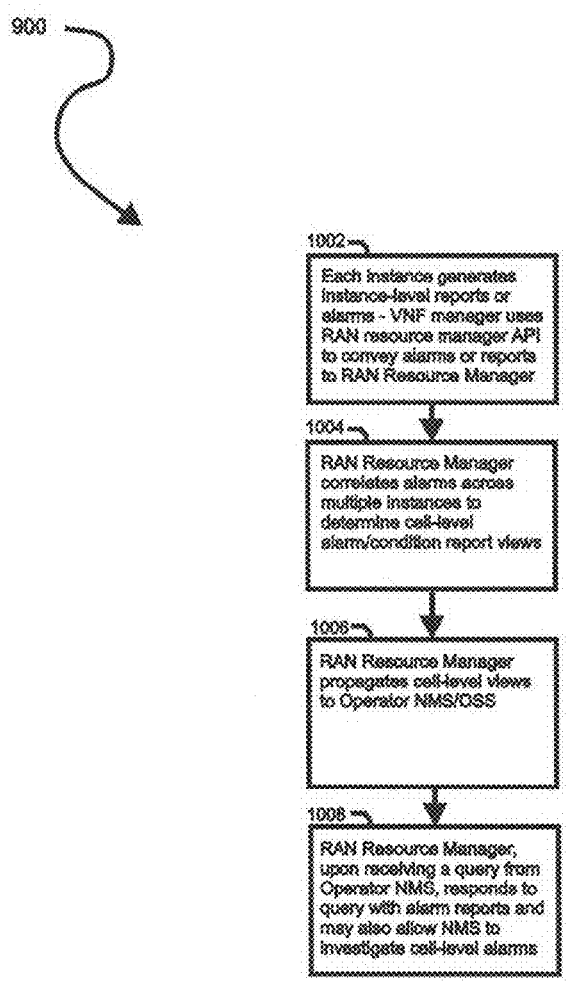

FIG. 10 illustrates a process 1000 of alarm reporting according to an embodiment of the present invention. The RAN resource manager exposes an API to allow VNF Manager to provide instance-level fault/alarm/condition reports, and RAN resource manager converts these to cell-level reports.

At block 1002, each instance, through its VNF Manager, generates instance-level condition reports or faults or alarms. VNF Manager uses the RAN Resource Manager API to convey alarms or reports to the RAN Resource Manager.

At block 1004, the RAN resource manager correlates alarms across multiple instances, using its database of mapping of cells to instances/resources, to determine cell-level alarm/condition report views.

At block 1006, the RAN resource manager propagates cell-level views to the Operator NMS/OSS.

At block 1008, the RAN resource manager, upon receiving a query from an Operator NMS through its API, responds to the query with alarm reports, and may also receive queries through a diagnostics API to allow NMS to query and drill down the cell-level alarms to identify instance/resource/module-level conditions or faults.

Figure 11:
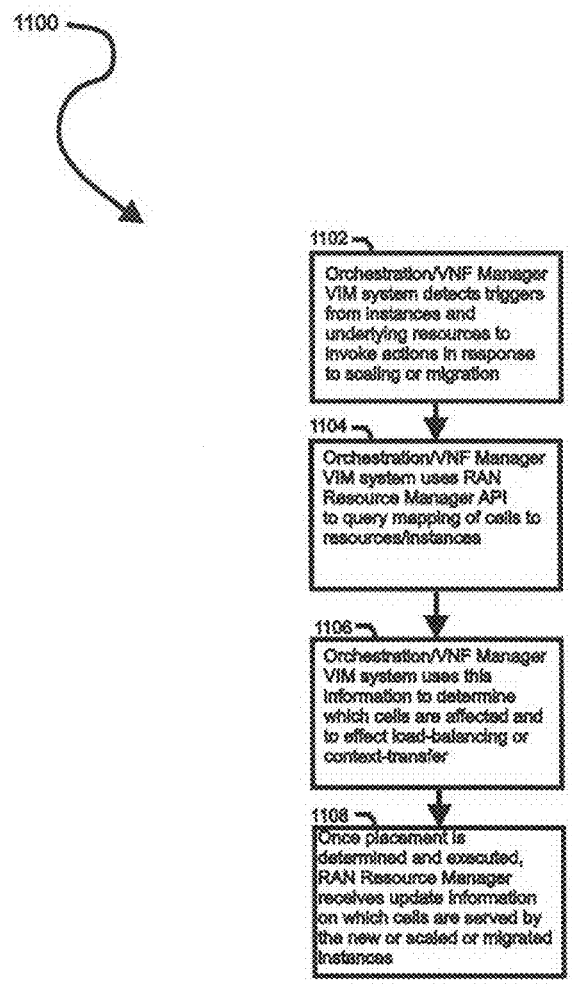

FIG. 11 illustrates a process of providing instance configuration information, such as information to be used in scaling, migration, and instance placement. The RAN resource manager exposes a query API that can be used by the Orchestration/VNF Manager to make optimal instance placement decisions.

At block 1102, the Orchestration/VNF Manager/VIM detects triggers from the instances and underlying resources to invoke actions in response to scaling or migration (for example, load-based thresholds or real-time constraints etc.).

At block 1104, the Orchestration/VNF Manager/VIM system uses the RAN resource manager API to query the mapping of cells to resources/instances.

At block 1106, the Orchestration/VNF Manager/VIM system uses this information to determine which cells are affected by potential scaling and migration, and what other potential VNFs can be affected (for example, other VNFs serving the same or associated cells), or to effect load-balancing or context-transfer procedures across instances.

At block 1108, once the placement of new/scaled or migrated instances is determined and executed, the Orchestration/VNF Manager/VIM system can use the RAN resource manager's API to update information on which cells are served by the new/scaled or migrated instance and its resource details.

Figure 12:
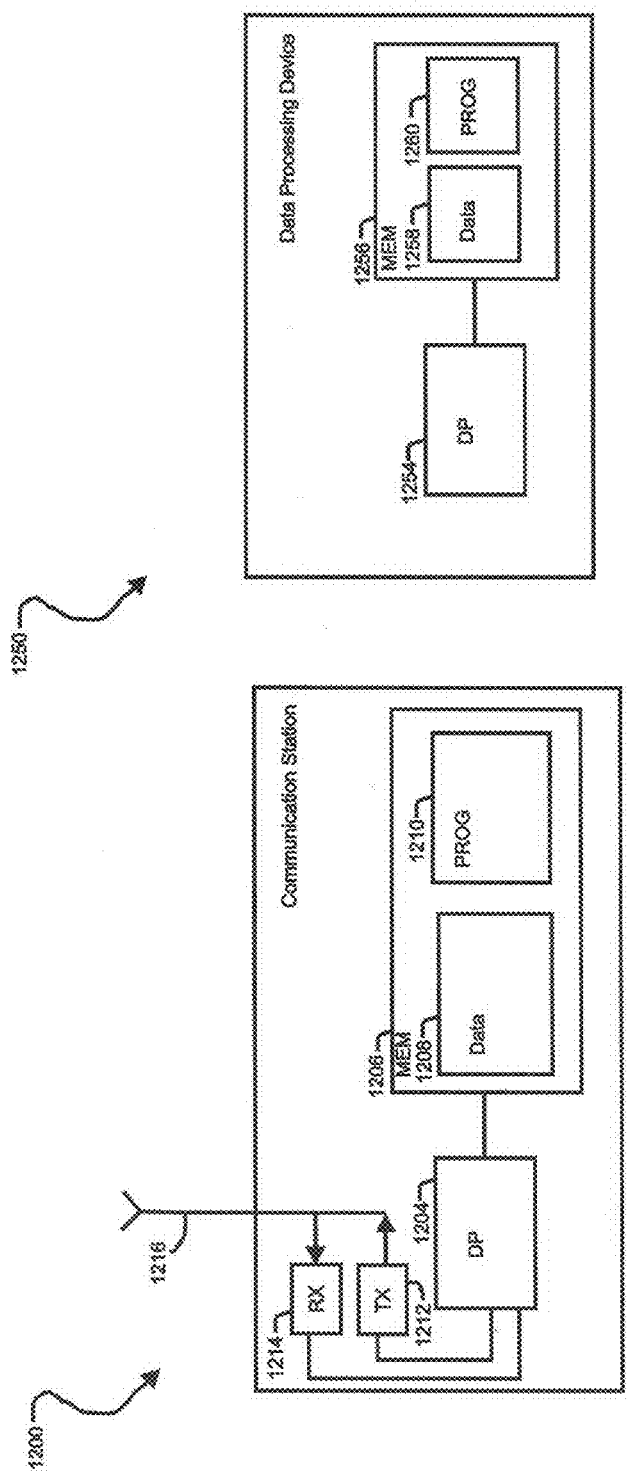
FIG. 12 illustrates elements that may be used to carry out embodiments of the present invention.

Reference is now made to FIG. 12 for illustrating a simplified block diagram of a wireless communication station 1200, such as a baseband unit, eNB, or other wireless communication station, and a data processing device 1250 such as a RAN resource manager, cloud manager, or other entity using, communicating, or processing data, but not directly performing wireless communication. The wireless communication station 1200 and the data processing device 1250 are illustrated here as distinct entities but, it will be understood that these entities may be manifested as virtual or "cloud" entities using resources taken from a distributed pool and organized according to need.

The communication station 1200 includes processing means such as at least one data processor (DP) 1204, storing means such as at least one computer-readable memory (MEM) 1206 storing data 1208 and at least one computer program (PROG) 1210 or other set of executable instructions, communicating means such as a transmitter TX 1212 and a receiver RX 1214 for bidirectional wireless communications via an antenna array 1216.

The data processing device 1250 includes processing means such as at least one data processor (DP) 1254, storing means such as at least one computer-readable memory (MEM) 1256 storing data 1258 and at least one computer program (PROG) 1260 or other set of executable instructions.

At least one of the PROGs 1210 in the eNB 1200 is assumed to include a set of program instructions that, when executed by the associated DP 1204, enable the device to operate in accordance with the exemplary embodiments of this invention, as detailed above. In these regards the exemplary embodiments of this invention may be implemented at least in part by computer software stored on the MEM 1206, which is executable by the DP 1204 of the eNB 1200, or by hardware, or by a combination of tangibly stored software and hardware (and tangibly stored firmware).

Similarly, at least one of the PROGs 1260 in the data processing device 1250 is assumed to include a set of program instructions that, when executed by the associated DP 1254, enable the device to operate in accordance with the exemplary embodiments of this invention, as detailed above. In these regards the exemplary embodiments of this invention may be implemented at least in part by computer software stored on the MEM 1256, which is executable by the DP 1254 of the UE 1250, or by hardware, or by a combination of tangibly stored software and hardware (and tangibly stored firmware). Electronic devices implementing these aspects of the invention need not be the entire devices as depicted at FIGS. 1-5 and 12 or may be one or more components of same such as the above described tangibly stored software, hardware, firmware and DP, or a system on a chip SOC or an application specific integrated circuit ASIC.

Various embodiments of the computer readable MEM 1206 and 1256 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 1204 and 1254 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block and signaling diagrams, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. A method comprising:
   storing in a network mapping database mapping information between one or more cells of a wireless communications network and virtual instances from a pool of virtual instances available for use by the one or more cells, wherein storing the mapping information comprises storing the mapping information in a repository;
   configuring an operator interface between the network mapping database and a network operator;
   configuring a virtual instance controller interface between the network mapping database and one or more network virtual instance controlling entities;
   in response to cell information received from or requested by the network operator and virtual instance information received from and requested by the one or more network virtual instance controlling entities, associating the cell information with associated virtual instances using the network mapping database;
   in response to identification of a specified cell, querying the network mapping database to determine which instances of appropriate layers are associated with the specified cell; and
   in response to a request from a network operator for cell information relating to a specified cell, determining consolidated cell information based on statistics relating to the virtual instances associated with the specified cell and providing the consolidated cell information to the network operator.

2. The method of claim 1, further comprising providing to the one or more virtual instance controlling entities virtual instance information responsive to the cell information received from the network operator.

3. The method of claim 1, further comprising providing to the network operator cell information responsive to the virtual instance information received from the one or more virtual instance controlling entities.

4. The method of claim 1, further comprising updating the mapping in response to changes to the network resources associated with the at least one cell and changes to associations between the at least one cell and the network virtual instance.

5. The method of claim 1, wherein the interfaces are application programming interfaces.

6. The method of claim 1, wherein the information received from the network operator comprises commands for changes to one or more cells and wherein the information received from the one or more virtual instance controlling entities comprises information identifying changes to virtual instances in response to the commands.

7. The method of claim 4, wherein the information received from the one or more virtual instance controlling entities comprises updates to virtual instance information and wherein updating the mapping comprises updating cell information in response to the updates to virtual instance information.

8. The method of claim 3, wherein the information received from the network operator is a request for cell status information, wherein the information received from the one or more virtual instance controlling entities comprises virtual instance information associated with the cell for which the query is made, and wherein providing to the network operator cell information responsive to the virtual instance information received from the one or more virtual instance controlling entities comprises determining cell status based on the received virtual instance information and providing the cell status information to the network operator.

9. The method of claim 2, wherein providing information to the one or more virtual instance controlling entities comprises providing, in response to queries from the one or more virtual instance controlling entities, information relating to the mapping of cells to virtual instances, for use in determining which cells are affected by potential actions related to the virtual instances.

10. An apparatus comprising:
    at least one processor;
    memory storing a program of instructions;
    wherein the memory storing the program of instructions is configured to, with the at least one processor, cause an apparatus to at least:
    store in a network mapping database mapping information between one or more cells of a wireless communications network virtual instances from a pool of virtual instances available for use by one or more cells, wherein storing the mapping information comprises storing the mapping information in a repository;
    configure an operator interface between the network mapping database and a network operator;
    configure a virtual instance controller interface between the network mapping database and one or more network virtual instance controlling entities;
    in response to cell information received from or requested by the network operator and virtual instance information received from and requested by the one or more network resource controlling entities, associate the cell information with associated virtual instances using the network mapping database;
    in response to identification of a specified cell, query the network mapping database to determine which instances of appropriate layers are associated with the specified cell; and
    in response to a request from a network operator for cell information relating to a specified cell, determining consolidated cell information based on statistics relating to the virtual instances associated with the specified cell and providing the consolidated cell information to the network operator.

11. The apparatus of claim 10, wherein the apparatus is further caused to provide, to the one or more virtual instance controlling entities, resource information responsive to the cell information received from the network operator.

12. The apparatus of claim 10, wherein the apparatus is further caused to provide to the network operator cell information responsive to the virtual instance information received from the one or more virtual instance controlling entities.

13. The apparatus of claim 10, wherein the apparatus is further caused to update the mapping in response to changes to the network virtual instances associated with the at least one cell and changes to associations between the at least one cell and the network virtual instance.

14. The apparatus of claim 10, wherein the interfaces are application programming interfaces.

15. The apparatus of claim 10, wherein the information received from the network operator comprises commands for changes to one or more cells and wherein the information received from the one or more virtual instance controlling entities comprises information identifying changes to virtual instances in response to the commands.

16. The apparatus of claim 13, wherein the information received from the one or more virtual instance controlling entities comprises updates to virtual instance information and wherein updating the mapping comprises updating cell information in response to the updates to virtual instance information.

17. The apparatus of claim 10, wherein the information received from the network operator is a request for cell status information, wherein the information received from the one or more virtual instance controlling entities comprises virtual instance information associated with the cell for which the query is made, and wherein providing to the network operator cell information responsive to the virtual instance information received from the one or more virtual instance controlling entities comprises determining cell status based on the received virtual instance information and providing the cell status information to the network operator.

18. The apparatus of claim 11, wherein providing information to the one or more virtual instance controlling entities comprises, in response to queries from the one or more virtual instance controlling entities of the mapping of cells to virtual instances for use in determining which cells are affected by potential scaling and migration.

19. A non-transitory computer readable medium storing a program of instructions, execution of which by at least one processor configures an apparatus to at least:
store in a network mapping database mapping information between one or more cells of a wireless communications network virtual instances from a pool of virtual instances available for use by one or more cells, wherein storing the mapping information comprises storing the mapping information in a repository;
configure an operator interface between the network mapping database and a network operator;
configure a virtual instance controller interface between the network mapping database and one or more network virtual instance controlling entities;
in response to cell information received from or requested by the network operator and virtual instance information received from and requested by the one or more network virtual instance controlling entities, associate the cell information with associated virtual instances using the network mapping database;
in response to identification of a specified cell, querying the network mapping database to determine which instances of appropriate layers are associated with the specified cell; and
in response to a request from a network operator for cell information relating to a specified cell, determining consolidated cell information based on statistics relating to the virtual instances associated with the specified cell and providing the consolidated cell information to the network operator.

20. The computer readable medium of claim 19, wherein the apparatus is further configured to provide to the one or more virtual instance controlling entities virtual instance information responsive to the cell information received from the network operator.

* * * * *